United States Patent
Okazaki

[11] Patent Number: 5,634,686
[45] Date of Patent: Jun. 3, 1997

[54] SEAT DEVICE FOR VEHICLES

[75] Inventor: Hiroyuki Okazaki, Chiryu, Japan

[73] Assignee: Aisin Seiki Kabushiki Kaisha, Japan

[21] Appl. No.: 620,844

[22] Filed: Mar. 20, 1996

[30] Foreign Application Priority Data

Mar. 21, 1995 [JP] Japan .................................. 7-088816

[51] Int. Cl.⁶ ...................................................... B60N 2/10
[52] U.S. Cl. .......................................... 297/336; 296/65.1
[58] Field of Search ..................... 296/63, 65.1; 297/331, 297/335, 336, 378.12

[56] References Cited

U.S. PATENT DOCUMENTS

| | | | |
|---|---|---|---|
| 4,408,798 | 10/1983 | Mizushima et al. | 296/65.1 X |
| 5,482,345 | 1/1996 | Bolsworth et al. | 297/336 X |
| 5,498,051 | 3/1996 | Sponsler et al. | 297/336 X |

FOREIGN PATENT DOCUMENTS

| | | | |
|---|---|---|---|
| 104425 | 6/1982 | Japan | 296/65.1 |
| 104424 | 6/1982 | Japan | 296/65.1 |
| 5-46978 | 12/1993 | Japan . | |

*Primary Examiner*—Peter R. Brown
*Attorney, Agent, or Firm*—Finnegan, Henderson, Farabow, Garrett and Dunner, L.L.P.

[57] ABSTRACT

A seat device for vehicles which comprises a supporting mechanism provided to a front portion of a seat and for rotatably supporting a seat to a floor of a vehicle body; a fixing mechanism provided with a mounting member supported through a pivotal axis to a rear portion of the seat, a first engaging member supported on the mounting member and engagable with the floor of the vehicle body, and a second engaging member supported on the mounting member and engagable with the seat; and a connecting mechanism having one end thereof connected to the mounting member and the second engaging member and the other end thereof connected to the seat or the supporting mechanism, and for controlling an engaging relation of at least the second engaging member.

9 Claims, 13 Drawing Sheets

SEAT DEVICE FOR VEHICLES

BACKGROUND OF THE INVENTION

1. Field of the Invention

The present invention relates to a seat device for vehicles; and more particularly, to a mechanism for automatically operating a fixing mechanism to retracted and projected states in accordance with the retracted or vertical position and the seating position or state of the seat.

2. Description of the Related Art

As shown in FIG. 13, a prior art seat device for vehicles (Japanese Pat. Utility Model Laid-Open Pub. No.5-46978) comprises a rotating and supporting mechanism P for rotatably supporting the front portion of a seat S to a floor F of a vehicle body and a fixing mechanism FM for detachably fixing the lower rear portion of the seat S to the floor F; The seat S is derricked or hung by a front portion of the seat S for lifting from a seated state or position to a retracted or verticalstate or position.

Since the fixing mechanism FM is fastened to the lower part of the rear portion of the seat S, the prior art seat device for vehicles has the disadvantages in that the securing portion FP projects from the fixing mechanism FM and is exposed when the seat S is in its vertical state. Thus, the carrying space of the platform cannot be effectively used with the seat in the retracted state due to such a structure which supports the seat S by a link L.

Further, although retacting the the fixing mechanism within the seat may be considered, it may be required to provide means for returning the fixing mechanism to the securing or latching state when returning the seat to the seating state; since the pitch between the rotating and supporting portion and engaging portion varies when storing the fixing mechanism.

Still further, it may be required to provide for unlatching the fixing state of the fixing mechanism in order to retract the fixing mechanism into the seat when placing the seat in its retracted or vertical state.

SUMMARY OF THE INVENTION

The present invention to provides a seat device for vehicles which automatically operates a fixing mechanism to both the retracted and projected states by a connecting mechanism coupling a seat or a supporting mechanism to a fixing mechanism upon the operation of the seat to the retracted or vertical and seatingu states.

The present invention provides a seat device for vehicles which automatically returns the fixing mechanism to a fixable state and cancels the fixed state.

In another aspect, the present invention provides a seat device for vehicles which comprises a supporting mechanism provided to a front portion of a seat for swingably supporting the seat to a floor of a vehicle body; a fixing mechanism provided with a mounting member supported through a pivoted axis to a rear portion of the seat, a first engaging member supported on the mounting member and engagable with the floor of the vehicle body, and a second engaging member supported on the mounting member and engagable with the seat; and a connecting mechanism having one end thereof connected to the mounting member and the second engaging member and the other end thereof connected to the seat or the supporting mechanism, and for controlling an engaging relation of at least the second engaging member.

In still another aspect, the present invention provides a seat device for vehicles wherein the one end of the connecting mechanism is connected to the mounting member through a spring member, thereby to engage the second engaging member with the seat before engaging the first engaging member with the floor of the vehicle body.

In a further aspect the present invention provides a seat device for vehicles wherein the connecting mechanism includes a first connecting member connected with the mounting member at one end thereof through the spring member and connected with the seat or the supporting mechanism at the other end thereof; and a second connecting member pivotably engaging the first connecting member at one end thereof and for controlling the engaging relation with the second engaging member.

In a still further aspect, the present invention provides a seat device for vehicles wherein the second connecting member is constituted so that the second engaging member is permitted to engage the seat when an angle of the seat with respect to the floor is within a predetermined angle.

In yet another aspect, the present invention provides a seat device for vehicles wherein the second connecting member is constituted so that the second connecting member allows control of an engaging relation between the second engaging member and the seat by relative movement of the first connecting member in the longitudinal direction thereof in response to rotation of the seat.

In another aspect, the present invention provides a seat device for vehicles wherein the first connecting member comprises a first link member having a first slot at a one end thereof, thereby to move relatively in the longitudinal direction thereof within the range of the first slot in response to the rotation of the seat; and the second connecting member comprises a second link member having a second slot engaged with receiving a pin formed on the second engaging member.

In a further aspect the present invention provides a seat device for vehicles wherein a pin formed on the mounting member is inserted into the first slot formed on the first link member and the spring member is interposed between the pin and a portion of the first link member.

In the seat device for vehicles of the present invention, the engaging relation between the second engaging member and the seat is controlled by the connecting mechanism, the one end of which is connected to the mounting member and the second engaging member in the fixing mechanism provided with both the mounting member supported at the rear portion of the seat through the pivotal axis and the second engaging member supported by the first engaging member and the mounting member engagable with the floor of the body supported on the mounting member seat and engagable with the seat, respectively, and the other end of which is connected to the supporting mechanism provided to the seat or the front portion of the seat and for supporting the seat to the floor of the body.

In the seat device for vehicles of the present invention, a work timing for the connecting relation between the connecting mechanism and the second engaging member and the connecting relation between the connecting mechanism and the mounting member is set by the spring member and the second engaging member is engaged with the seat before the first engaging member engages a floor of the body.

In the seat device for vehicles of the present invention, the engaging relation between the second engaging member and the seat is controlled, through the second connecting member rotatably engaged to one end thereof, by the first connecting member connected at the one end thereof to the mounting member in the fixing mechanism provided with both the first engaging member supported on the mounting member supported through a pivoted axis to the rear portion of the seat through the spring member and engagable with a floor of the body and the second engaging member supported on the mounting member and engagable with the seat, and connected at the other end thereof, to the supporting mechanism provided to the seat or the front portion of the seat and for rotatably supporting the seat to the floor of the body.

In the seat device for vehicles of the present invention, the second engaging member engaged with the seat by the second connecting member, when the angle of the seat with respect to the floor is within said predetermined angle.

In the seat device for vehicles of the present invention, the engaging relation between the second engaging member and the seat is controlled by the second connecting member in response to the relative movement of the first connecting member in a longitudinal direction in response to the rotation of the seat.

In the seat device for vehicles of the present invention, the engaging relation between the second engaging member and the seat is controlled by the second connecting member in response to the relative movement of the first connecting member in the longitudinal direction in accordance with the rotation of the seat.

In the seat device for vehicles of the present invention, the engaging relation between the second engaging member and the seat is controlled by the second connecting member in response to the relative movement of the first connecting member having the first slot formed at an end thereof in the longitudinal direction within the range of the first slot in accordance with the rotation of the seat and by the second connecting member engaging a pin formed in the second engaging member by the second slot.

In the seat device for vehicles of the present invention, since the pin formed in the mounting member is inserted into the first slot formed in the first connecting member and the spring member is interposed between the pin and the portion of the first connecting member the pin is engaging the end of the first slot.

The seat device for vehicles of the present invention has the effect of automatically carrying out the return to a fixable state in the fixing mechanism and the cancellation of a fixed state in the fixing mechanism, since the seat device controls an engaging relation between the second engaging member and the seat by the connecting mechanism.

The seat device for vehicles of the present invention has the effect of securing a firm fixation of the seat to the floor of the body through the fixing mechanism of the seat, since the seat device sets the work timing of the connecting relation between the connecting mechanism and the second engaging member and the connecting relation between the connecting mechanism and the mounting member by the spring member and it also makes the second engaging member engage the seat before the first engaging member engages a floor of the body thereby.

The seat device for vehicles of the present invention has the effect of automatically carrying out the return to the fixable state in the fixing mechanism thereof and the cancellation of the fixed state in the fixing mechanism, since the seat device controls the engaging relation between the second engaging member and the seat by the first connecting member through the second connecting member rotatably engaging the end of the first connecting member.

The seat device for vehicles of the present invention has the effect of automatically carrying out the return to the fixable state in the fixing mechanism and the cancellation of a fixed state in the fixing mechanism by the certain angle described above, since the second connecting member causes the second engaging member to engage the seat when the angle of the seat to the floor is within the predetermined angle.

The seat device for vehicles of the present invention has the effect of automatically carrying out the return to the fixable state in the fixing mechanism and the cancellation of a fixed state in the fixing mechanism in response to the rotation of the seat, since the second connecting member controls an engaging relation between the second engaging member and the seat by the relative movement of the first connecting member in a longitudinal direction in response to the rotation of the seat.

The seat device for vehicles of the present invention has the effect of making it possible to carrying out automatically and firmly the return to a fixable state in the fixing mechanism and the cancellation of the fixed state in the fixing mechanism by the engaging relation thereof with the first slot in response to the rotation of the seat, since the seat device controls the second engaging member and the seat by the relative movement of the first connecting member in the longitudinal direction within the range of the first slot and by the second connecting member engaging the pin formed in the second engaging member by the second slot.

The seat device for vehicles of the present invention has the effect of making it possible to carry out automatically and firmly the return of the fixing mechanism to the fixable state and the cancellation of the fixed state in the fixing mechanism before and after the engaging and detaching of the first engaging member with and from the floor, respectively, since the spring member is interposed between the pin formed in the mounting member inserted into the first slot and the portion of the first connecting member.

DETAILED DESCRIPTION OF PREFERRED EMBODIMENTS

Detailed description of the present invention will be given with reference to the preferred embodiments, accompanying the drawings as follows.

Figure 1:
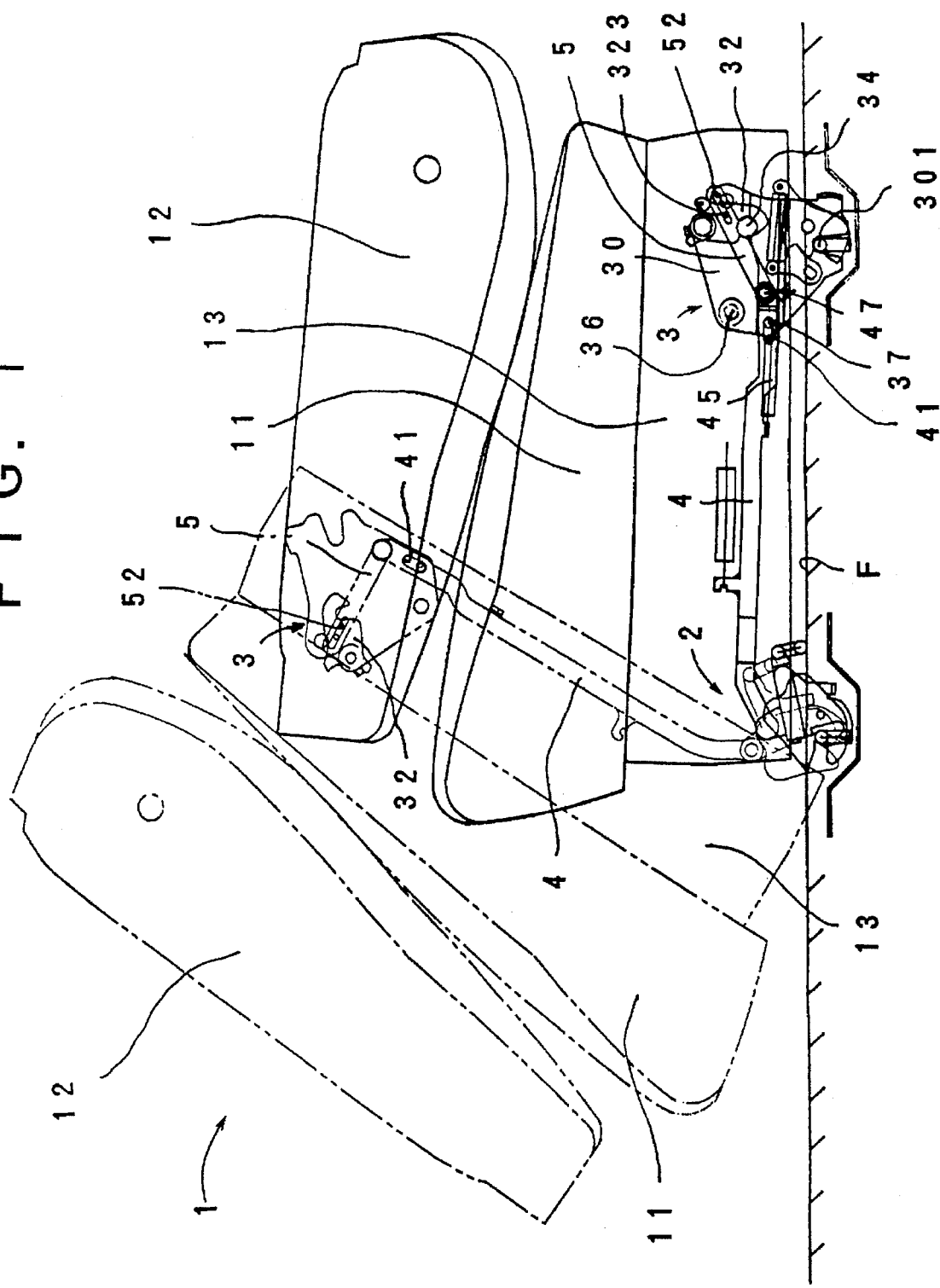
FIG. 1 is a side view showing a seat device for vehicles as a first preferred embodiment of the present invention.
Figure 9:
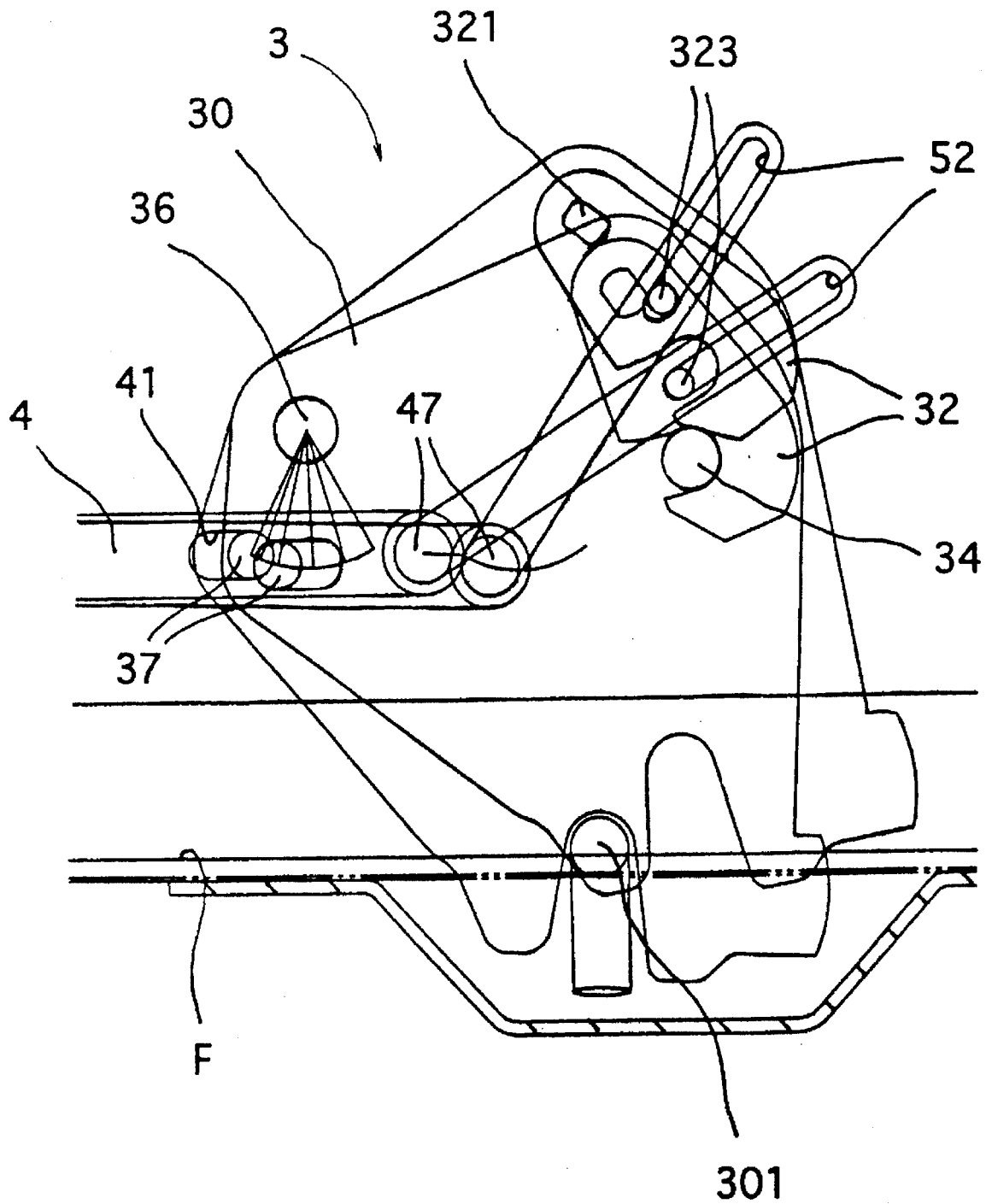
FIG. 9 is a fragmentary side view showing a positional relation between the members when locking the second hook for the fixing mechanism in the device of FIG. 1.

As shown in FIG. 1 or 9, a seat device for vehicles as a first preferred embodiment of the present invention comprises a supporting mechanism 2 provided to the front portion of a seat 1 and for rotatably supporting the seat 1 to a floor F of a body; a fixing mechanism 3 provided with a mounting member 30 supported through a pivotal axis to a rear portion of the seat 1; a first engaging member 31 supported on the mounting member 30 and engaging a striker 301 mounted to the floor F of the body and a second engaging member 32 supported on the mounting member 30 and engagable with the seat 1; a first connecting member 4 connected with the mounting member 30 at one end thereof through a spring member 45 and either the seat 1 or the supporting mechanism 2 at the other end thereof; and a second connecting member 5 rotatably engaged with the first connecting member 4 at one end thereof and for controlling the engaging relation with the second engaging member 32. A connecting mechanism comprises the first connecting member 4 and the second connecting member 5 described above.

As shown in FIG. 1, the seat 1 comprises a seat cushion 11, a seat back 12 supported through a reclining mechanism (not shown); and a seat bracket 13 provided to the lower portion of the seat cushion 11. The supporting mechanism 2 is arranged to the front and lower portion of the seat bracket 13, and the fixing mechanism 3 is arranged to the rear and lower portion thereof, respectively.

Figure 2:
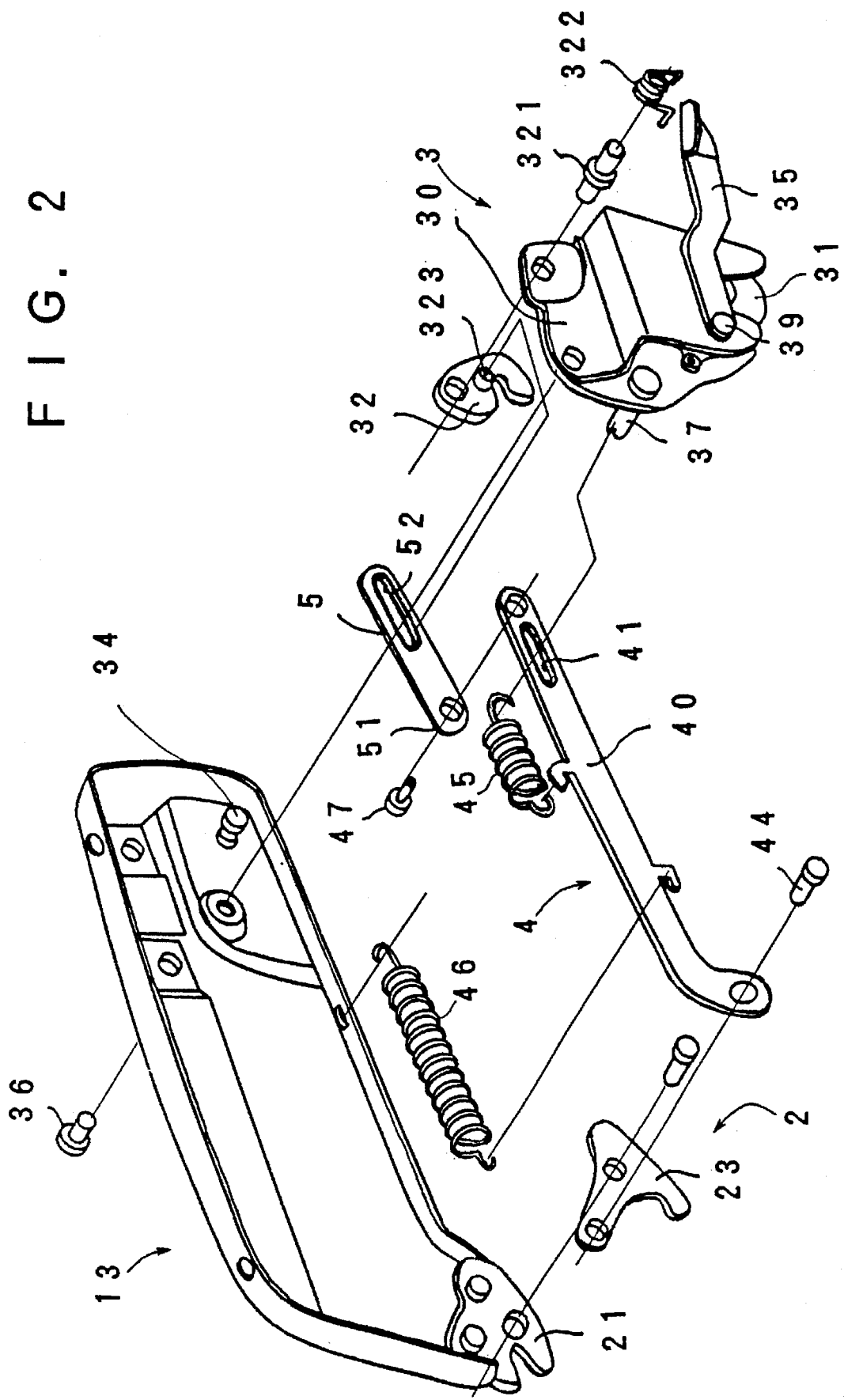
FIG. 2 is an disassembled and perspective view of the device of FIG. 1.
Figure 5:
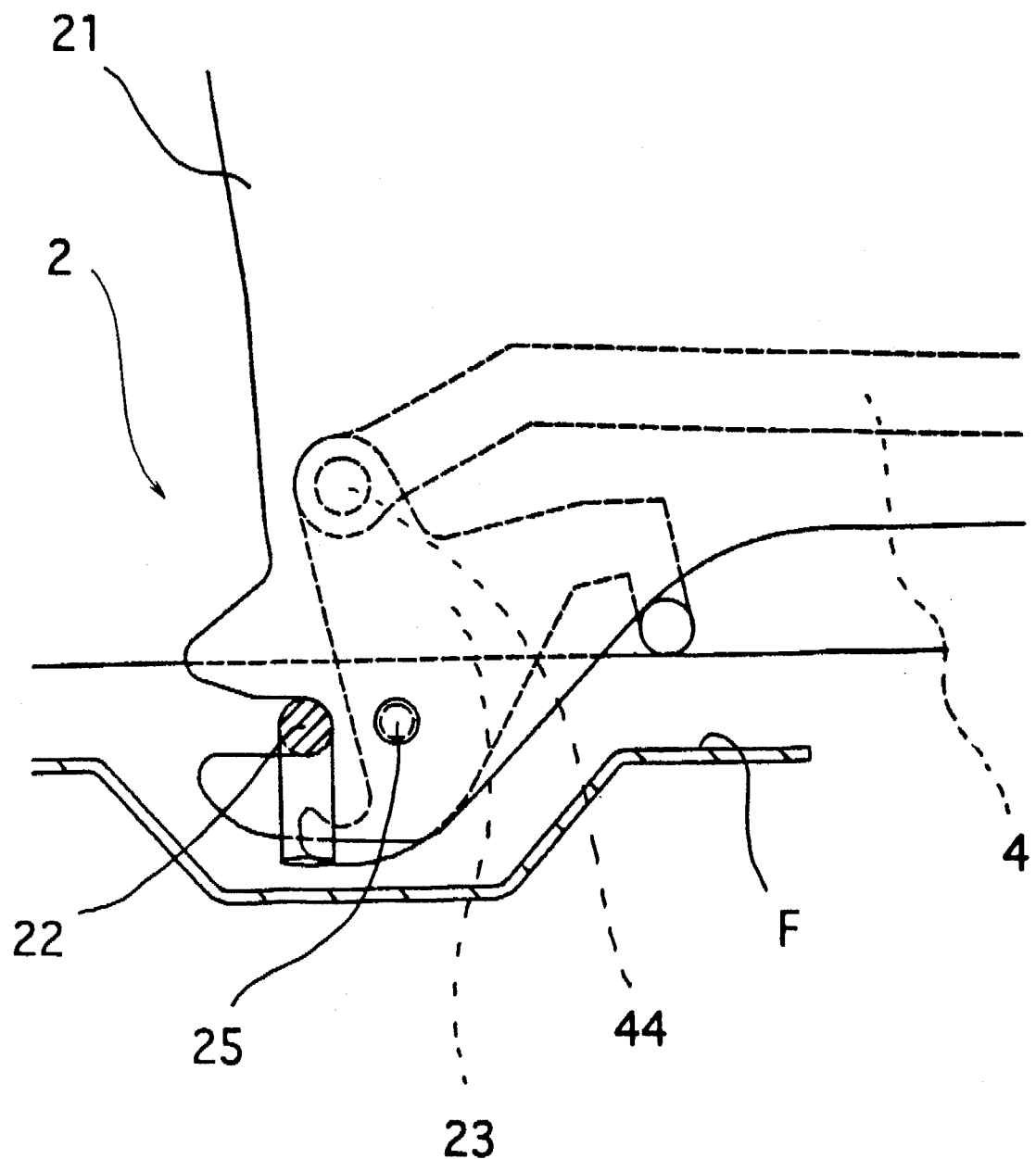
FIG. 5 is a fragmentary side view showing a positional relation between the members in the supporting mechanism under the seated state in the device of FIG. 1.
Figure 7:
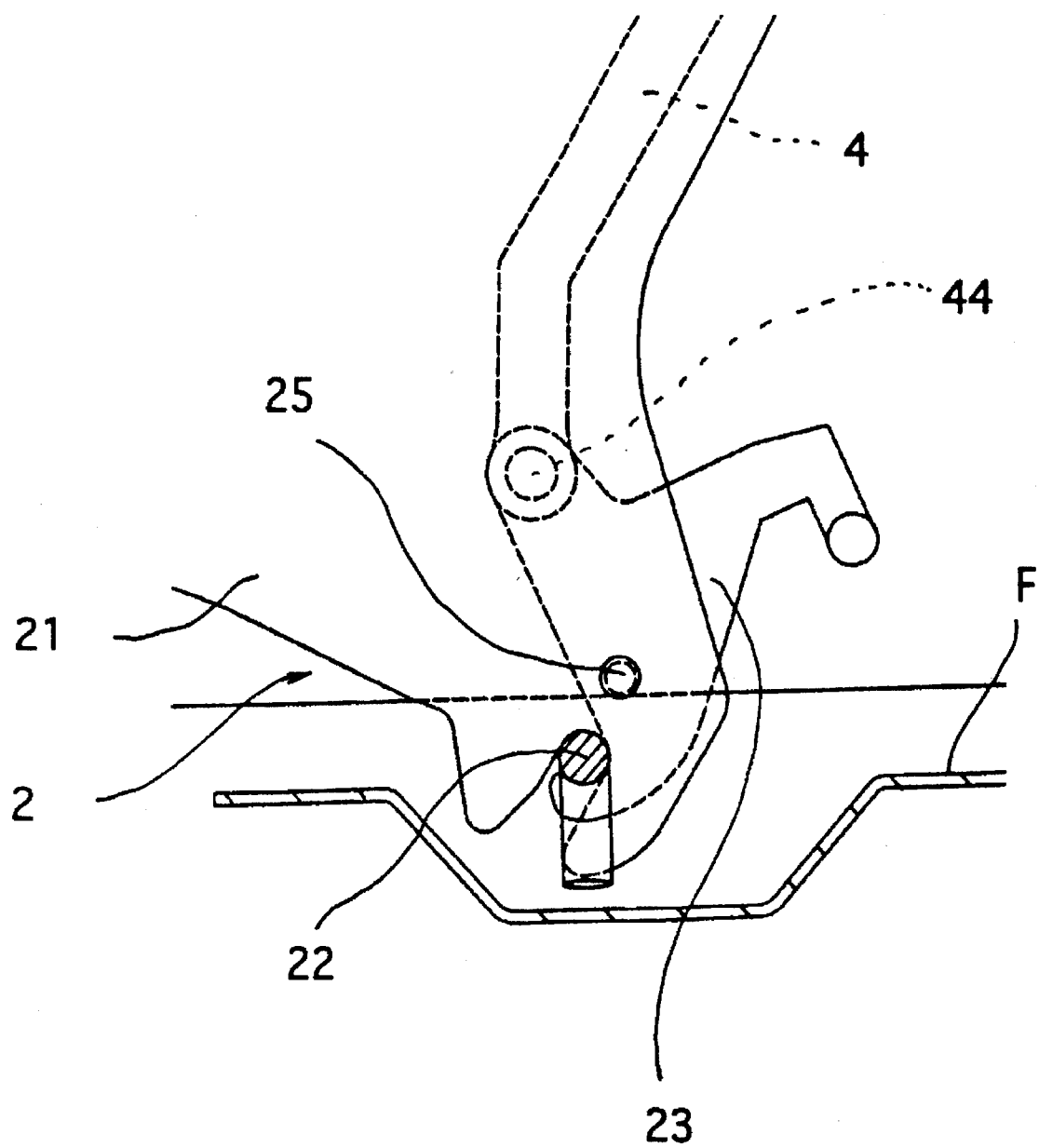
FIG. 7 is a fragmentary side view showing a positional relation between the members in the supporting mechanism in a retracted state thereof in the device of FIG. 1.

As shown in FIGS. 2 and 5 or FIG. 7, the supporting mechanism 2 comprises a third hook 21 provided at the front and lower portion of the seat bracket 13; a third striker 22 engaging with provided on the floor F of the body and engaged with the third hook 21 and a rough T-letter shaped fourth hook 23 swingably or rotatably supported to the third hook 21 by a pin 25, a one end of the fourth hook 23 being engagable with the third striker 22 in an upright state and the other end of the fourth hook 23 being contact with the floor F of the body.

Figure 4:
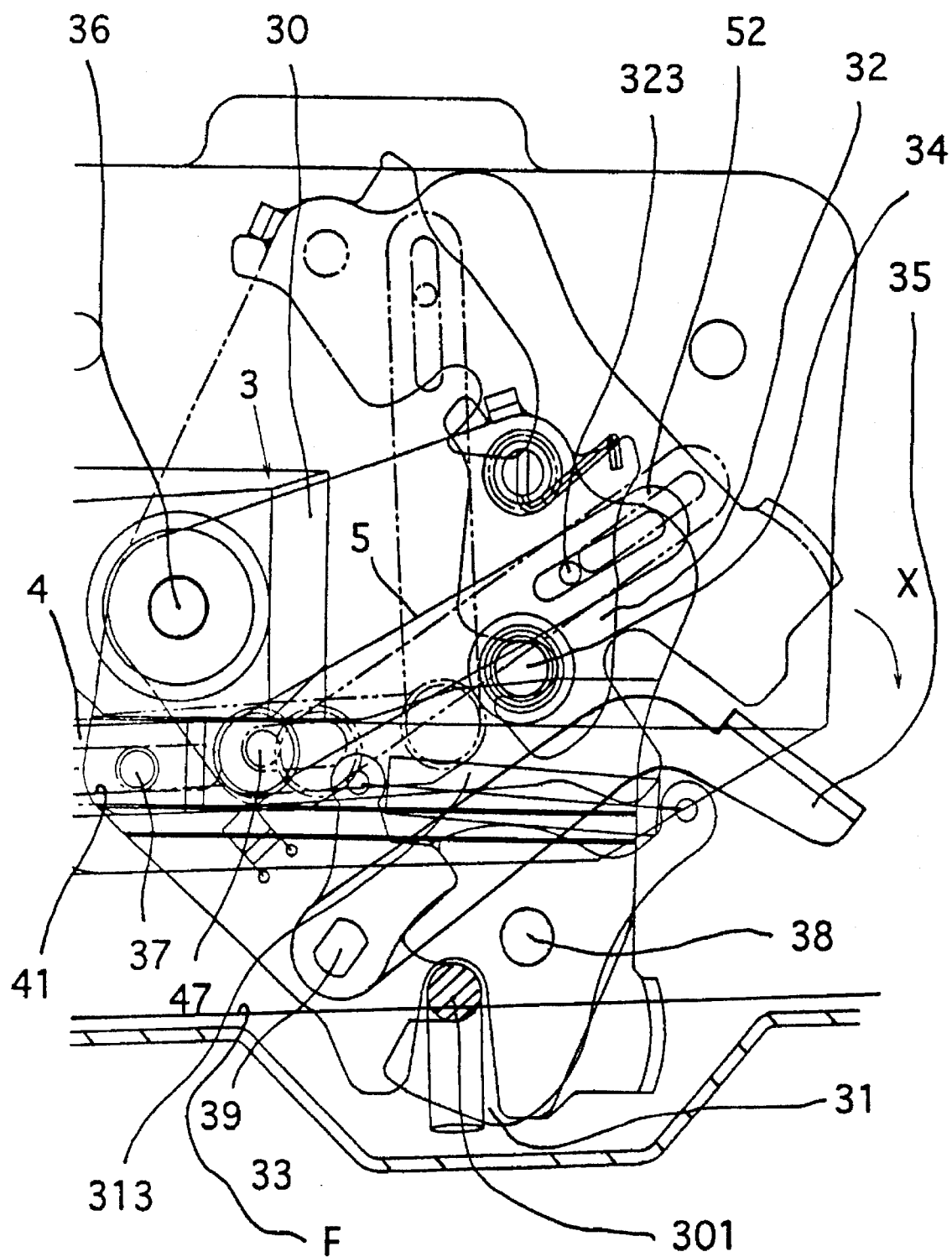
FIG. 4 is a detailed side view showing the details of the fixing mechanism in the device of FIG. 1.

As shown in FIG. 1 or 4, the fixing mechanism 3 comprises a bracket 30 as a mounting member axially supported movably to the rear and lower portion of the seat bracket 13 by a pin 36 as a pivoted support; a first hook 31 constituting a ratchet engaging the first striker 301 fixed to the body floor F as the first engaging member movably supports the bracket 30 by a pin 38; a cancellation lever 35 swingably supported on the bracket 30; a pole 33 integrally swing with the cancellation lever 35 and for locking the first hook; a second hook 32 as a second engaging member swingably supported to the seat bracket 13; and a second striker 34 fixed to the seat bracket 13 and engaging the second hook 32.

The cancellation lever 35 and the pole 33 are both rotatably supported to the bracket 30 by a pin 39. The second hook 32 is urged in the direction engaging the second striker 34 by a spring 322 wound around a pin 321, and a pin 323 is provided.

A coil spring 313 is engaged between upper end of the pole 33 integrally provided to a pin 39 supporting the cancellation lever 35 and upper end of the first hook 31.

As shown in FIGS. 1 and 2, the first connecting member 4 is composed of a rough J letter-shaped link 40, a first slot 41 is formed at a portion closed to one end thereof, and the other end is connected with the other end of the fourth hook 23 by a pin 44. The first slot 41 is inserted with a pin 37 provided to a bracket 37 in the fixing mechanism 3 and a spring 45 is engaged as the spring member between the pin 37 and the first connecting member 4, while a spring 46 is engaged between a center portion slightly closed to the other end of the first connecting member.

Figure 3:
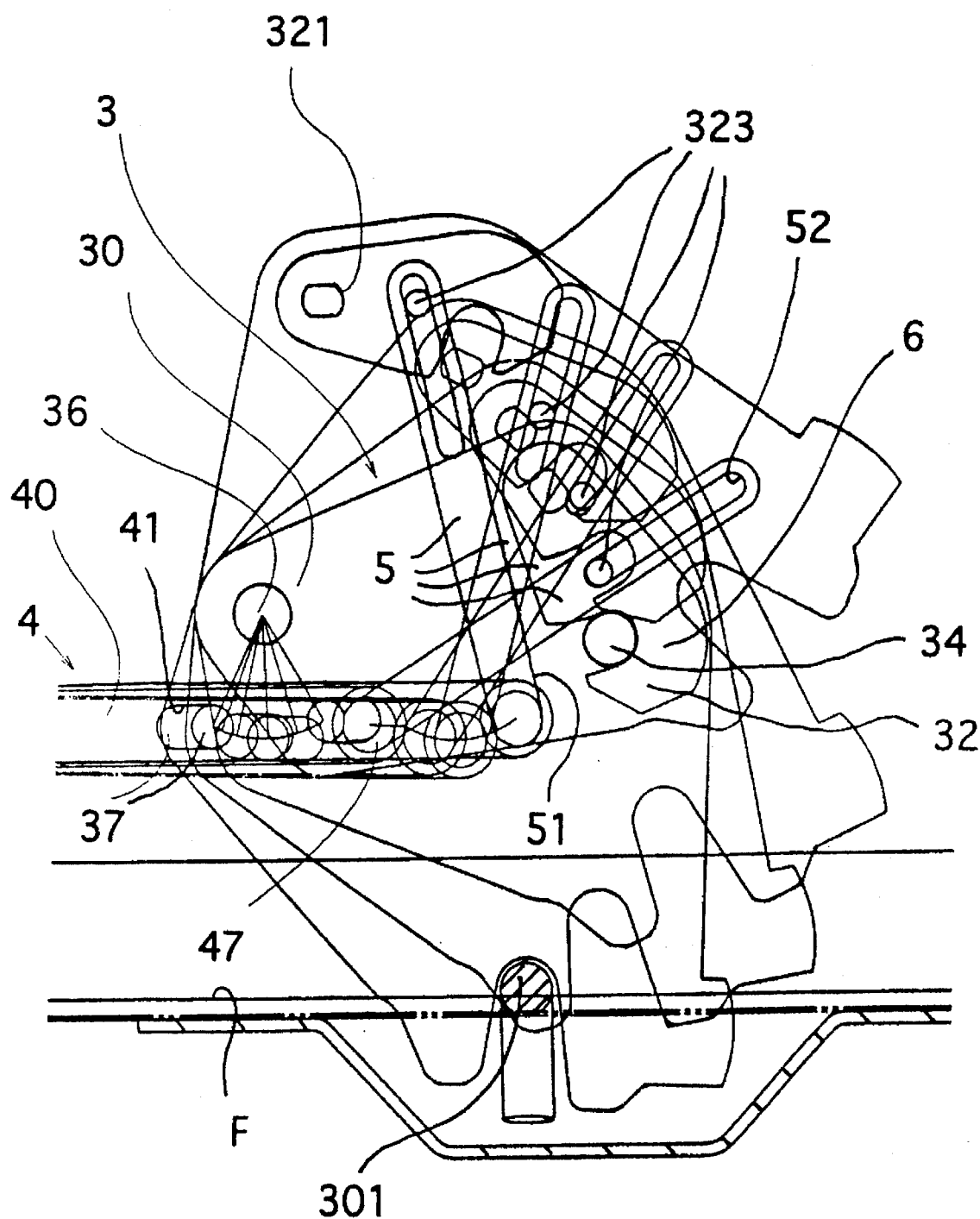
FIG. 3 is an explanatory view of a main portion showing each position a fixing mechanism and the second connecting member in response to the rotation of the seat in the device of FIG. 1.

As shown in FIG. 1 or 3, the second connecting member 5 is swingably supported by a pin 47 provided to one end of the first connecting member 4 by one end 51, and a second slot 52 is formed on the other end side and inserted with the pin 323 into the second hook 32.

The detailed description of the operation will be given for the seat device for vehicles in the first preferred embodiment composed of the constitution described above, accompanying with FIG. 3 or 9 in the following.

In the case of pushing down the seat back 12 to the side of a seat cushion 11 and moving the cancellation lever 35 in the direction of X in FIG. 4, the pole 33 rotates clockwise and removes the engaging state with the first hook 31. Then, the first hook 31 is swung counter-clockwise by the spring force of the spring 313 to cancel the lock between the first striker 301 and the first hook 31.

In the case of rotating the seat cushion 11 counter-clockwise and swinging it only in a certain angle in the above-mentioned state, the first connecting member 4 moves in the longitudinal direction, to the right in the figure, while receiving the spring force of the spring 46. Therefore, the second connecting member 5, rotatably supported by a pin 47 provided to the right end of the first connecting member 4 by the one end 51 thereof, moves in the right direction as viewed in the figure.

Figure 8:
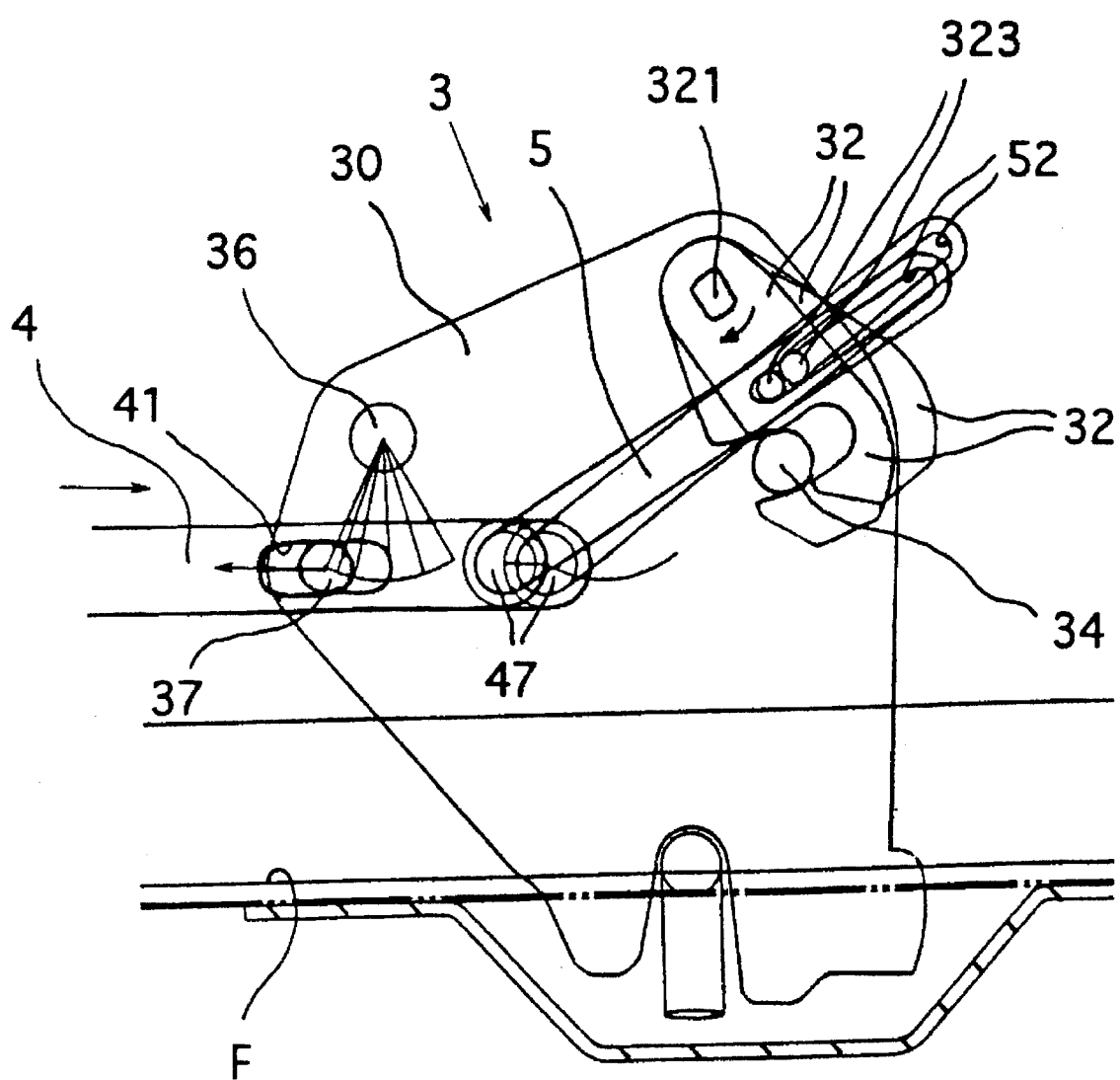
FIG. 8 is a fragmentary side view showing a positional relation between the members when removing the lock of the second hook from the fixing mechanism in the device of FIG. 1.

Accordingly, as shown in FIG. 8, the locked state between the second striker 34 and the second hook 32 is canceled by bringing the left end of a second slot 52 formed in the second connecting member 5 into right contact with the pin 323 and moving the second hook 32 counter-clockwise against the spring force of the spring 322 while making the pin 321, the axis thereof.

Since the first connecting member 4 moves in the longitudinal direction, to the right in the figure, while allowing slack, in response to the resulting rotation, when further rotating the seat cushion counter-clockwise, the bracket 30, that is: the fixing device 3, is retracted in the seat bracket 13, as shown in FIG. 1, by bringing the left end of the first slot 41 formed in the first connecting member into right contact with a pin 37 and swinging the bracket 30 of the fixing mechanism 3 counter-clockwise, about the pin 36.

When the seat cushion 11 is further rotated counter-clockwise to reach the upright position, as shown in FIG. 7, the supporting mechanism 2 is pivotably attached to the third hook 21 by a pin 25 against the third striker 22 of the body floor F. The mechanism engaging the third hook 21 provided at the front and lower portion of the seat bracket 13 and makes the fourth hook 23 move clockwise while making the pin 25 the center thereof by the counter-clockwise swinging reaction force of the first connecting member 4 while making the pin 44 the center thereof. As a result, the fourth hook 23 is locked, and the seat cushion 11 is fixed to the body floor.

Figure 6:
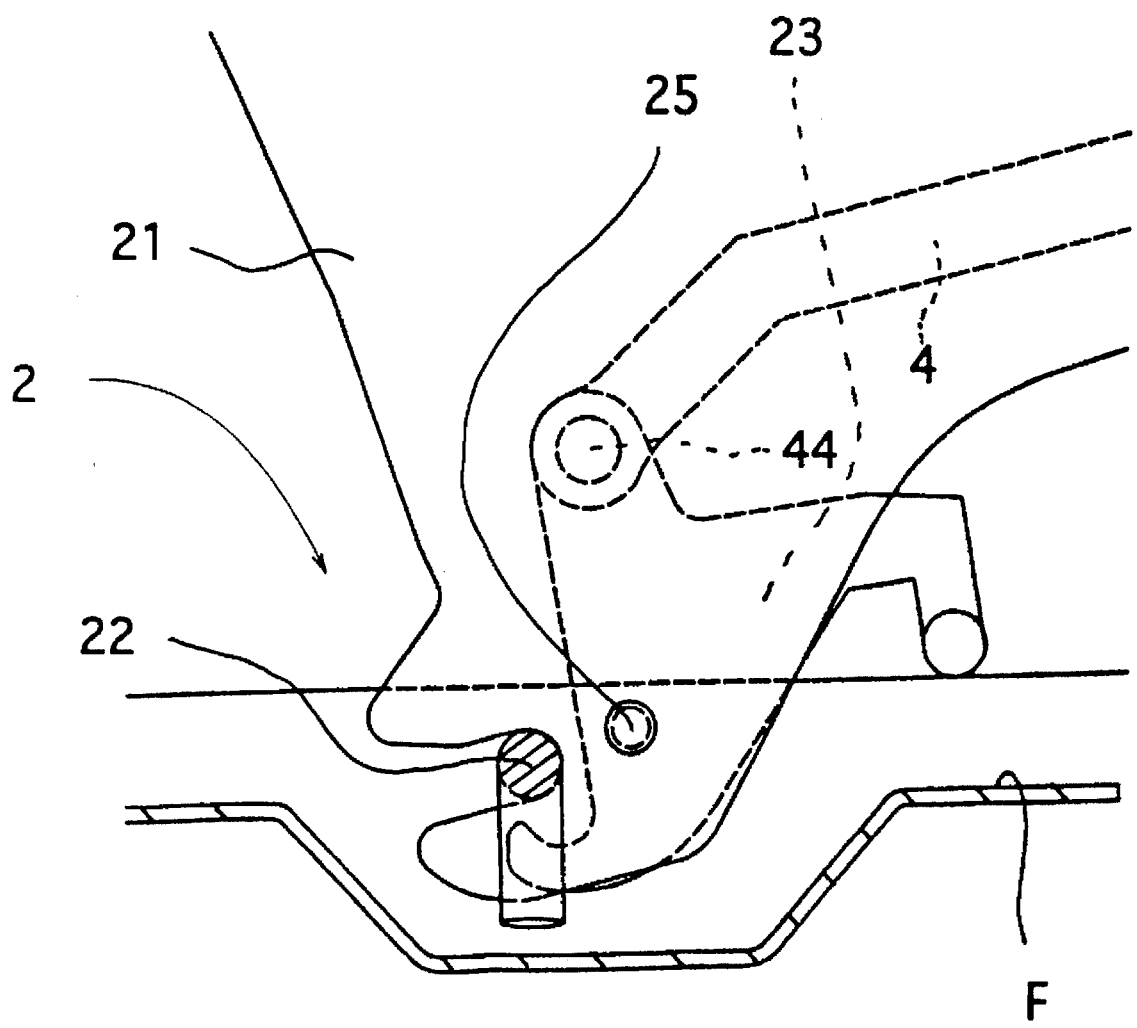
FIG. 6 is a fragmentary side view showing a positional relation between the members in the supporting mechanism on the way of seat rotation in the device of FIG. 1.

In the case of changing the seat cushion 11 from the upright state to the seating state, as shown in FIG. 6, the fourth hook 23 is separately spaced from the third striker by rotating the seat cushion 11 to the body floor F.

In the case of further rotating the seat cushion 11 clockwise, in the response to the rotation the first connecting member 4 moves in the longitudinal direction, to the left in the figure, while allowing the spring 46 to be in slack. Therefore, as shown in FIG. 3, the bracket 30 in the fixing device 3 retracted in the seat bracket 13 gradually projects downward from the seat bracket 13 by rotating the bracket 30 in the fixing device 3 by the pin 47 provided at the one end thereof clockwise while making the pin 36 the center thereof. At this time, the pin 37 receives the energizing force from the spring 45 and maintains the right contact with the right end of the first slot 41.

In the case of further rotating the seat cushion 11 clockwise to reach the position at a certain angle to the body floor F, the first connecting member 4 moves in the longitudinal direction, to the left in the figure, and the second connecting member 5 rotatably supported by the pin provided a one end thereof to the right end of the first connecting member 4. At this time, the left end of the second slot 52 and the pin 323 become separated from each other.

Accordingly, as shown in FIG. 9, the second hook 32 is allowed to be in the locked state to the second-striker 34 and becomes in the fixable state by receiving the energizing force of the spring 322 while making the pin 321 the center and moving the second hook 32 clockwise.

After the first hook 31 is brought into right contact with the first striker 301 of the body floor F by further swinging the seat cushion 11 clockwise and in the case of further pushing to start the seat cushion 11, the first hook 31 engages the first striker 301.

At this time, the pole 33 moves counter-clockwise to give an engaged state with the first hook 31, and as shown in FIG. 4, the first striker 301 and the first hook 31 are in the locked state with each other, and the seat back 12 is separated and stood up by the reclining mechanism from the seat cushion 11, resulting in completing the seated or seating state.

The seat device for vehicles of the first preferred embodiment presenting the operations described above has the effect of making it possible to automatically carry out the return of the fixing mechanism 3 to the fixable state thereof and the cancellation of the fixed state in the fixing mechanism, since the first connecting member 4 controls the engaging relation between the second hook 32 and the striker 34 through the second connecting member 5 pivotably engaged to the end thereof.

Further, the seat device for vehicles of the first preferred embodiment has the effect of making it possible to automatically carry out the return of the fixing mechanism to a fixable state thereof and the cancellation of the fixed state in the fixing mechanism, since the second connecting member 5 engages the second hook 32 with the second striker 34 fixed to the seat cushion 13 when the angle of the seat 1 to the floor is within the predetermined angle.

Still further, the seat device for vehicles of the first preferred embodiment has the effect of making it possible to automatically carry out the return of the fixing mechanism 3 to the fixable state thereof and the cancellation of the fixed state in the fixing mechanism to the fixable state, since the second connecting member 5 controls the engaging relation between the second hook 32 and the striker 34 fixed to the seat cushion 13 by the connecting member 4 moving relatively in the longitudinal direction in response to the swing of the seat 1.

Furthermore, the seat device for vehicles of the first preferred embodiment has the effect of making it possible to carry out automatically and firmly the return to the fixable state in the fixing mechanism 3 and the cancellation of the fixed state in the fixing mechanism 3 by an engaging relation with the slots 41 and 52 in response to the swing of the seat 1, since the first connecting member 4 controls the engaging relation between the second hook 34 and the seat 1 by moving relatively in the longitudinal direction within the range of the first slot 41 in response to the swing of the seat 1 and the second connecting member 5 engaging with the pin 323 formed in the second hook 32 by the second slot 52.

Still further, the seat device for vehicles of the first preferred embodiment has the effect of making it possible to automatically and firmly carry out the return to the fixable state in the fixing mechanism 3 and the cancellation of the fixed state in the fixing mechanism 3 before and after the first hook 31 engages with and detaches from the striker 301 of the floor, since the spring 45 is interposed between the pin 37 formed in the bracket 30 of the fixing mechanism inserted the first slot 41 formed in the first connecting member 4.

Further, the set device for vehicles of the first preferred embodiment has the effect of making it possible to use effectively a load space by spreading it and prevent scratching and damaging it, since the fixing mechanism 3 is retracted in the seat bracket 13 when making the seat 1 in a retracted state thereof.

Still further, a seat device for vehicles of the first preferred embodiment has the effect of ensuring the fixation of the seat 1 to the floor F, since the fixing mechanism 3 is made to return automatically and enforcedly to the fixable state preliminarily by the first and second connecting members 4 and 5 when making the seat 1 in the seated state thereof.

Figure 10:
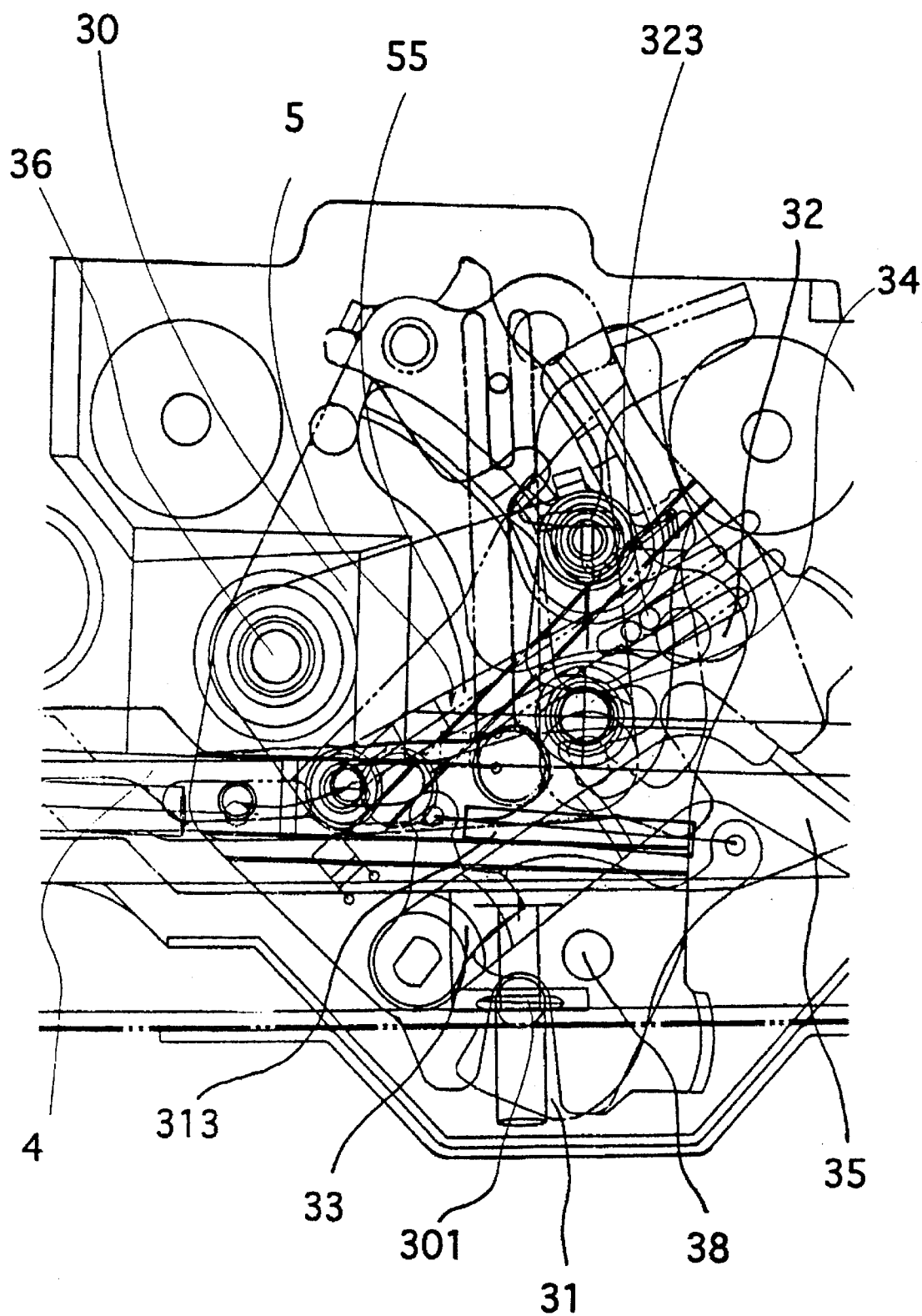
FIG. 10 is a fragmentary side view showing a positional relation between the second connecting members and the fixing mechanism in a seated state thereof in the device of a second preferred embodiment of the present invention.
Figure 11:
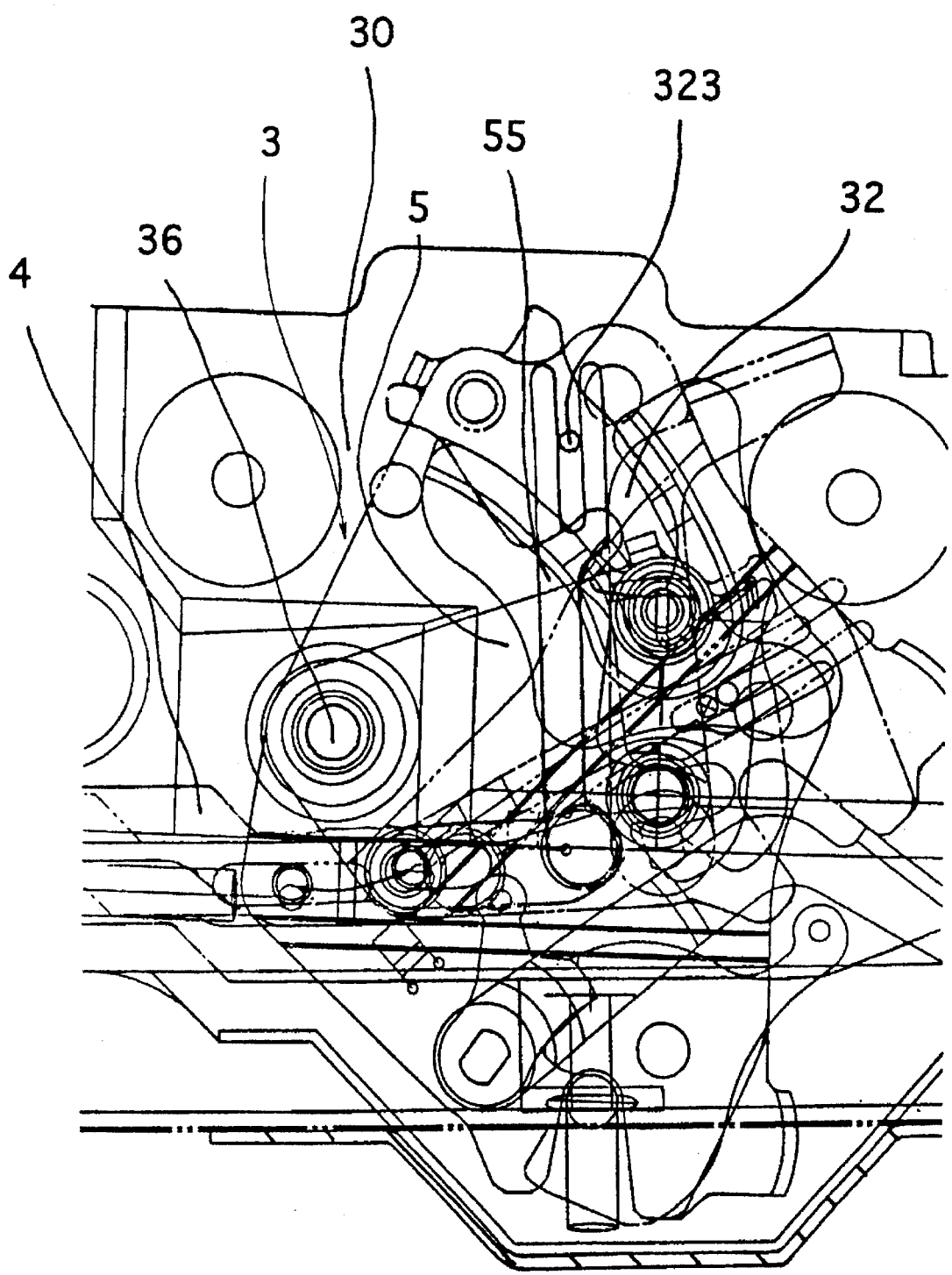
FIG. 11 is a fragmentary side view showing a positional relation between the second connecting member and the fixing mechanism in a retracted state in the device of the second preferred embodiment of the present invention.

As shown in FIGS. 10 and 11 in a seat device for vehicles of the second preferred embodiment, is different from the first preferred embodiment in that the second connecting member 5 is constructed by a rough h-letter shaped member 55.

The seat device for vehicles of the second preferred embodiment has the similar operation effect as above and the effect of making it easy to avoid the interference with the second striker.

Figure 12:
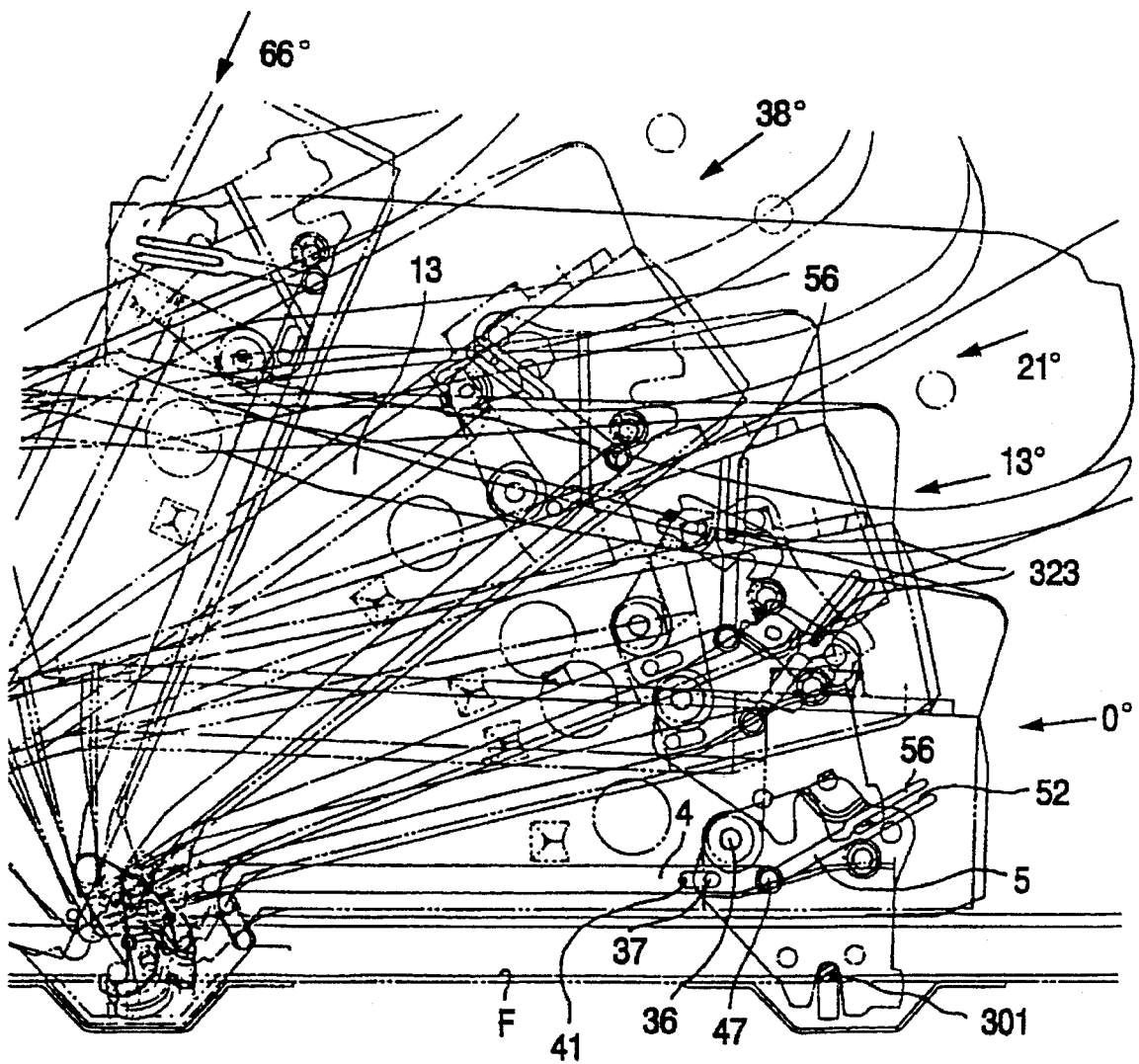
FIG. 12 is a side view showing a positional relation of the seat, the first and second connecting members and the fixing mechanism from a seated state to an upright state thereof in the device of a third preferred embodiment of the present invention.
Figure 13:
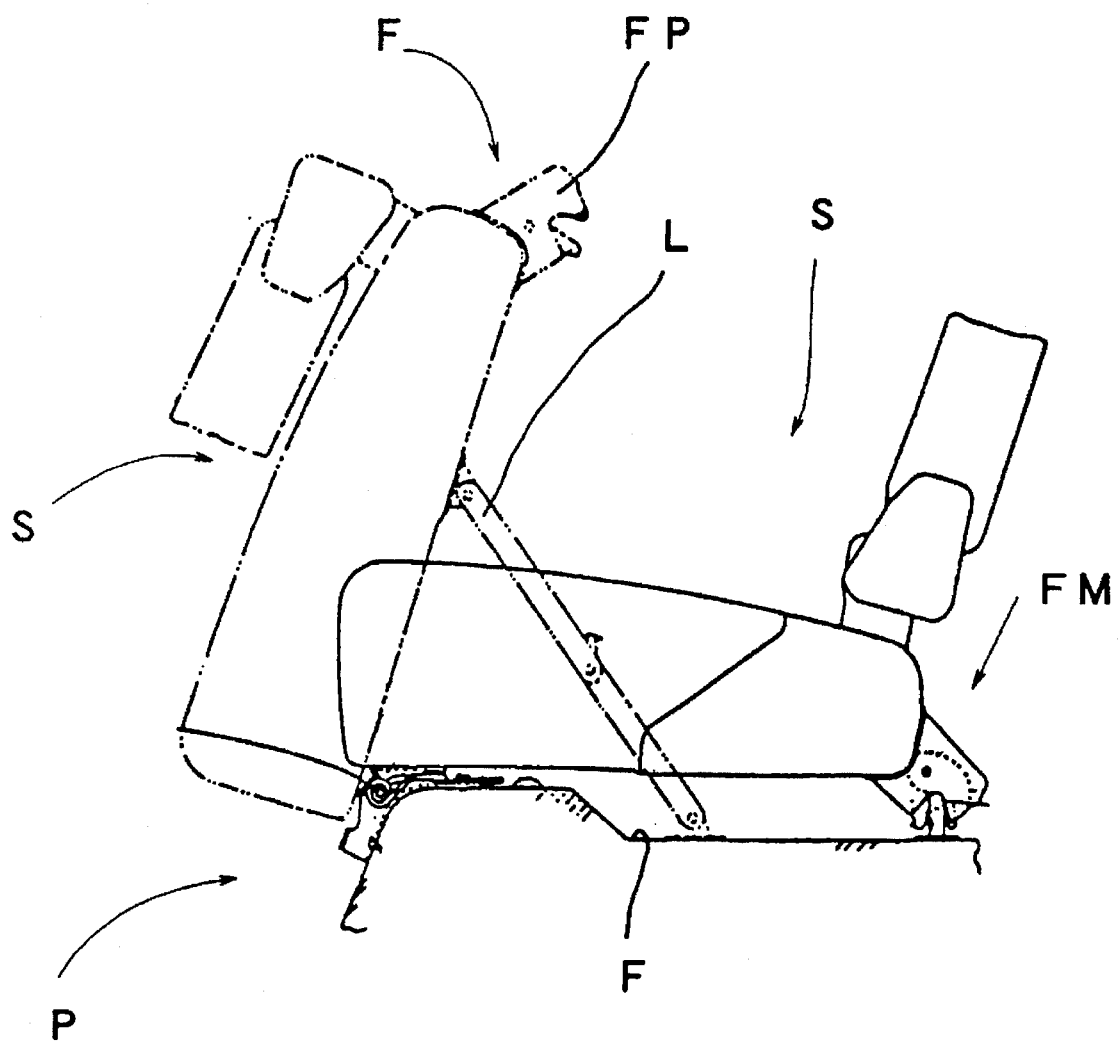
FIG. 13 is a side view showing a prior art apparatus.

As shown in FIG. 12, a seat device for vehicles of the third preferred embodiment, is different from the first preferred embodiment in that the second connecting member 5 is constructed by a rough Y-letter shaped member 56.

The seat device for vehicle of the third preferred embodiment has the similar operation effect as above and the effect of making it easy to avoid the interference with the second striker.

In the first and second preferred embodiments described above, the operation has been explained by fixing the seat 1 and pivoting only the fixing mechanism 3 for the convenience of the explanation. In the third preferred embodiment, however, the pivoting behavior was shown with respect to the bracket 30, the first connecting member 4 and the second connecting member 5 in the fixing mechanism 3 in response to the swing of the seat 1 in FIG. 12.

Apparently from FIG. 12, the engagement between the second hook 32 and the second striker 34 is canceled at the angle of approximately 13° at the second position from the bottom and then, shows the state thereof at each angle from 21°, 38° and ultimately 66° up to the retracted state, resulting in clarifying the positional relation of each member at each angle.

In other words, apparently from FIG. 12, at the angle of approximately 38°, the fixing mechanism 3 is retracted in the seat bracket 13 and the fourth hook 23 in the supporting mechanism 2 is locked to the third striker 22 of the body floor F, respectively.

When returning the upright state to the seated state, the rotation is reversed from above description. In case of approaching to the floor F at the angle of approximately 130, the second hook 32 engages with the second striker 34, and then, the first hook 31 engages with the first striker 301 of the floor F to lock with each other.

It may also be good that the engaging relation with the second hook 32 and the second striker 34 is controlled by a right contact portion arranged to bring the second hook 32 in the first preferred embodiment in right contact with one end (pin 47) of the first connecting member 4 in the first preferred embodiment and by bringing the right contact portion of the second hook 32 in right contact with the one end (pin 47) of the first connecting member 4 in the first preferred embodiment after canceling the second connecting member 5 in the first preferred embodiment.

What we claim is:

1. A seat device for vehicles having a seat with a front portion and a rear portion, said device comprising:

a supporting mechanism for pivotably mounting the front portion of the seat to a floor of a vehicle body;

a fixing mechanism including a mounting member for pivotable attachment to the rear portion of said seat, a first engaging member coupled to said mounting member and engagable with the floor of the vehicle body when the seat is in a seating position and disengagable from the floor of the vehicle body when the seat is in an upright position, and a second engaging member coupled to said mounting member for engaging said seat to position the fixing mechanism in a fixing position when the seat is in the seating position; and a connecting mechanism having one end connected to said mounting member and said second engaging member and having another end coupled to said supporting mechanism, for controlling the engagement and disengagement of at least said second engaging member for pivoting the fixing mechanism to a retracted position during movement of the seat from the seating position to the upright position.

2. A seat device for vehicles according to claim 1, wherein a spring member connects said one end of said connecting mechanism to said mounting member, said spring member urging said connecting mechanism in a direction to control said second engaging member to engage said seat before engaging said first engaging member with said floor of said vehicle body during movement of the seat from the upright position to the seating position.

3. A seat device for vehicles according to claim 1, wherein said connecting mechanism comprises a first connecting member connected to said mounting member at one end by a spring member and connected to said supporting mechanism at the other end; and a second connecting member pivotably connected to said first connecting member at one end for controlling the engagement and disengagement of said second engaging member for pivoting the fixing mechanism to the retracted position during movement of the seat from the seating position to the upright position.

4. A seat device for vehicles according to claim 3, wherein said second connecting member is configured to cause said second engaging member to engage said seat at times when an angle of said seat with respect to said floor of the vehicle body reaches a predetermined angle during movement of the seat from the upright position to the seating position.

5. A seat device for vehicles according to claim 3, wherein said second connecting member is configured to control the engagement and disengagement of said second engaging member and said seat by relative movement of said first connecting member in a longitudinal direction extending between the front and rear portions of the seat in response to movement of said seat between the upright position and the seating position.

6. A seat device for vehicles according to claim 3, wherein said mounting member has a first pin extending therefrom, said first connecting member having a first slot at said one end receiving said first pin to link said first connecting member to said mounting member, said first connecting member being movable in the longitudinal direction thereof within the range of said first slot in response to the movement of said seat between the upright position and the seating position; and said second engaging member having a second pin extending therefrom, said second connecting member having a second slot receiving said second pin to link said second engaging member to said second connecting member.

7. A seat device for vehicles according to claim 6, wherein said spring member is interposed between said first pin of said mounting member and a portion of said first connecting member.

8. A seat device for vehicles according to claim 3, wherein said second connecting member has a pair of spaced parallel longitudinally extending legs forming a slot open at one end of said second connecting member, and said second engaging member has a pin extending therefrom and contained in said open ended slot.

9. A seat device for vehicles according to claim 3, wherein said second connecting member having an elongate shank portion with a shank width dimension and a pair of spaced parallel longitudinal legs extending from said shank portion, said pair of legs having an outside width dimension greater than the shank width dimension.

* * * * *